United States Patent [19]
Bieker et al.

[11] 3,807,676
[45] Apr. 30, 1974

[54] BOOM SUPPORT FOR SPRAY VEHICLES

[75] Inventors: Ron D. Bieker, Jackson; Melvin A. Bergkamp, Saline, both of Kans.

[73] Assignee: Rickel, Inc., Kansas City, Mo.

[22] Filed: Aug. 23, 1972

[21] Appl. No.: 282,914

[52] U.S. Cl................. 248/285, 137/344, 239/167
[51] Int. Cl............................ B05b 9/02, E01h 3/02
[58] Field of Search ........... 248/278, 282, 285, 289; 239/159, 161, 163, 166, 167, 168; 137/344

[56] References Cited
UNITED STATES PATENTS

| | | | |
|---|---|---|---|
| 3,587,624 | 6/1971 | Holloway | 239/167 X |
| 3,544,009 | 12/1970 | Schlueter | 239/159 X |
| 2,770,493 | 11/1956 | Fieber | 239/168 |
| 2,995,307 | 8/1961 | McMahon | 239/166 X |
| 3,616,469 | 11/1971 | Injeski | 248/289 X |

Primary Examiner—J. Franklin Foss
Attorney, Agent, or Firm—Lowe, Kokjer, Kircher, Wharton & Bowman

[57] ABSTRACT

A frame structure on the vehicle provides a pivot mounting for the boom, permitting the boom to swing about a vertical axis in either direction from an outwardly extended spray position. The boom has a stored position alongside the vehicle. Means are provided for hydraulically swinging the boom from the extended to the side-stored position whenever desired; such means operates however without interferring with normal permissive deflection of the boom during operation in the event of interference by trees and other objects. The power means for hydraulically swinging the boom also elevates the boom to a higher level as it moves toward the stored position.

5 Claims, 9 Drawing Figures

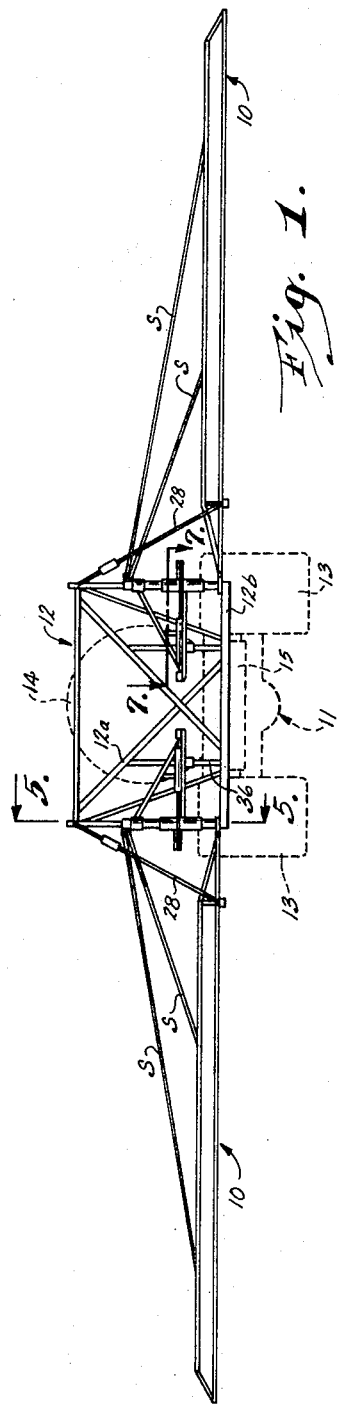
Fig. 1.
Fig. 5.
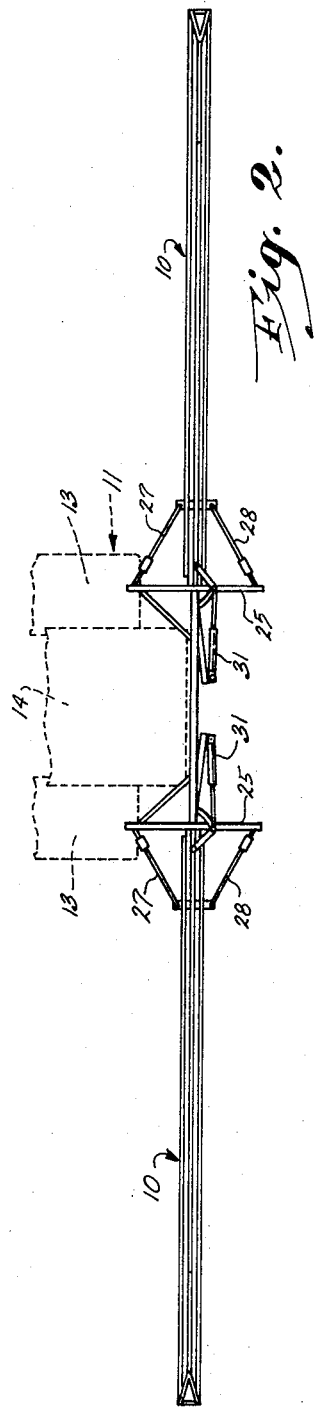
Fig. 2.
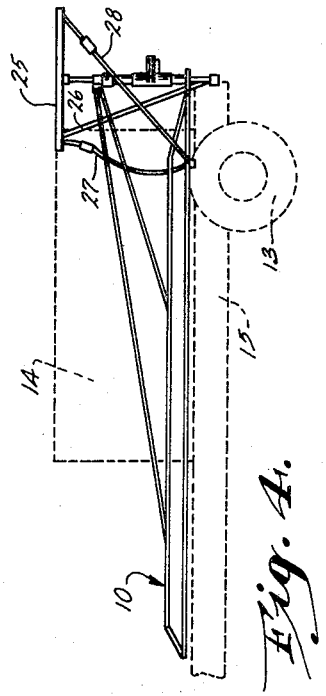
Fig. 4.
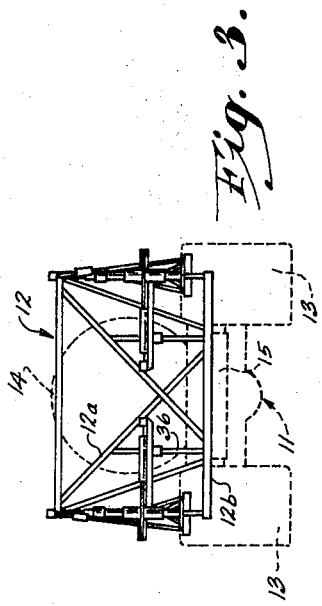
Fig. 3.

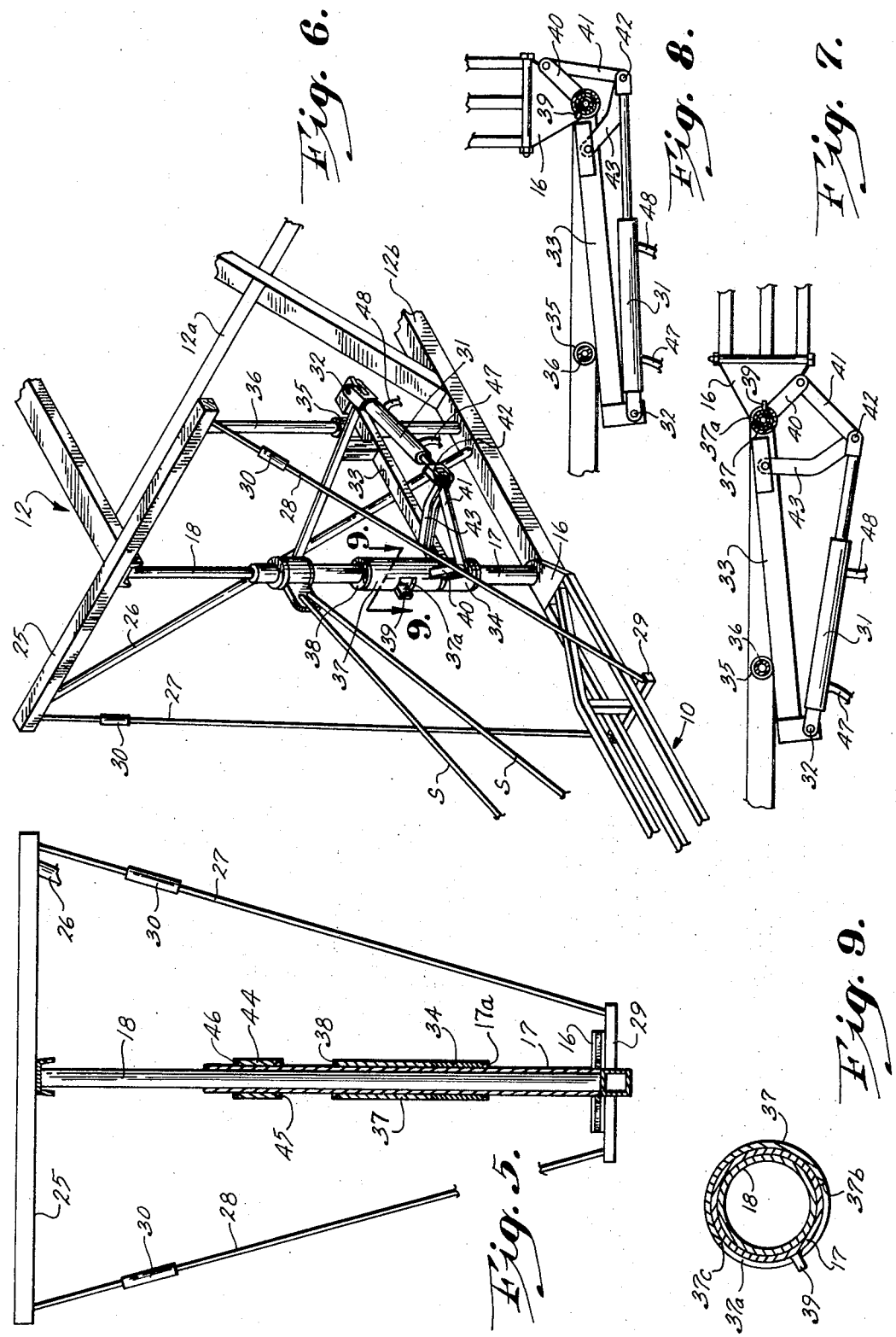

BOOM SUPPORT FOR SPRAY VEHICLES

BACKGROUND OF THE INVENTION

The present invention relates to spraying apparatus having elongate booms carrying a plurality of spray nozzles and in which the elongate booms are pivotally connected to a boom rack which is attached to one end of a spray vehicle.

The use of spray booms to apply liquid fertilizer from field vehicles having oversized tires is well known. Some of the problems associated with the use of spray booms and one solution to these problems are presented in U.S. Pat. No. 3,587,624, issued to James T. Holloway. Holloway discloses a boom stabilizing structure and a means of elevating the boom to a side stored position over the rear wheels. However, the driver is required to leave the vehicle and manually swing the spray boom to the side stored position or to start the boom moving to the spray position each time such action is required. Moreover, certain frictional forces inherent to the elevating structure impose undesirable resistance to the swinging movement.

BRIEF SUMMARY OF THE INVENTION

One of the principal objects of the present invention is to provide a support and operating arrangement for spray booms by which the boom is, when in the field, yieldably stabilized in an extended spray position, but can be swung to a side stored position on the vehicle by other than manual manipulation of the boom.

Another object of the invention is to provide a power source involving but a single thrust means to effect movement of the boom to a side stored position above the oversized tires.

Yet another object of the invention is to provide a boom mounting and operating arrangement wherein the boom can be at any time power-swung to the side stored position, yet in which the boom retains its full capability of deflection from and return to the extended spray position in the event the boom strikes a tree, gate or fence post or similar object, without interferring with or involving operation of the power means.

In the embodiment disclosed herein, the foregoing objectives are achieved by providing in association with the boom rack a hydraulic cylinder operably connected with the spray boom to effect swinging of the boom about a vertical pivot axis to the side stored position. The elevation of the boom during swinging is brought about by providing suspension means which are so placed as to lift the boom progressively as the angle of deflection from the extended spray position increases. The suspension members also serve to yieldably stabilize the boom in the extended spray position, permitting the boom to deflect from and return to the spray position upon encounters with trees, fence posts or the like, all without effecting the ability of the power means to move the boom, when required, to the side stored position.

BRIEF DESCRIPTION OF DRAWINGS

In the accompanying drawings which form a part of the specification and which are to be read in conjunction therewith, and in which like reference numerals indicate like parts in the various views:

FIG. 1 is a rear elevational view of a pair of spray booms operably connected to a carrier vehicle in accordance with the preferred embodiment of the invention and disposed in the extended, spray position;

FIG. 2 is a plan view of same;

FIG. 3 is a rear elevational view like FIG. 1, but with the booms in the side stored position;

FIG. 4 is a side elevational view from the left side of FIG. 3;

FIG. 5 is an enlarged fragmentary, partly sectional, view along line 5—5 of FIG. 1 in the direction of the arrows;

FIG. 6 is an enlarged fragmentary perspective view of a boom rack and boom end, showing in greater detail the power means;

FIG. 7 is an enlarged sectional view taken generally along line 7—7 of FIG. 1, but showing the boom power cylinder in a partly extended condition corresponding to the initiation of boom movement by the cylinder;

FIG. 8 is an enlarged sectional view similar to FIG. 7, but with the cylinder fully extended and the boom rotated to the side stored position; and FIG. 9 is a greatly enlarged sectional view taken along line 9—9 of FIG. 6 in the direction of the arrows.

DETAILED DESCRIPTION OF THE INVENTION

Referring to FIGS. 1 and 2, two elongate spray booms 10 are shown in lateral spray positions extending from opposite sides of a carrier vehicle 11. The carrier vehicle may be of any construction; as an example, attention is called to the vehicle disclosed in Rickel U.S. Pat. No. 3,494,442. The booms are in each instance connected with the opposite ends of a boom rack 12. The rack is securely attached to the rear of the vehicle, to the back of the oversized rear tires 13. A tank 14 suitable for holding liquid fertilizer is mounted on the vehicle bed 15.

Each boom 10 is constructed such that it is suitable for supporting a hose to deliver fertilizer to a plurality of spray nozzles (not shown) spaced along the boom 10. The details of the spray system are not a part of my invention, so no further description will be given. Since there is a pair of booms, and since each boom is mounted identically to the vehicle (except for one being the mirror image of the other) only one mounting will be described.

Referring to FIGS. 5, 6 and 9, the spray boom 10 terminates at its inner end with an attaching plate 16. The plate 16 is in turn attached to the lower end of a sleeve member 17. The sleeve 17 rotatably fits over a vertical post 18, so that sleeve 17 may rotate and slide up and down on the post. The post 18 is secured at its upper and lower ends to the boom rack 12.

Included as part of the boom rack 12 is a cross head 25 which overlies the upper end of post 18 and is generally parallel with the fore and aft axis of the vehicle. The forward end of cross head 25 is braced by an inclined structural 26 secured at one end to the cross head and at the other to the horizontal structural 12b of the boom rack 12. The cross head 25 has its ends located approximately equidistant from the upright post 18. Attached to the ends of the cross head 25 are flexible members 27 and 28, which conveniently may be steel cables. The other ends of the cables are connected respectively to the ends of a brace 29 on the boom.

Each cable has a turnbuckle 30 for making adjustments in the length of the cable.

Power thrust means for pivoting the boom comprises the hydraulic cylinder 31. One end of the cylinder is pivoted as at 32 to a structural 33. The structural 33 is supported at one end by a short sleeve 34 which rotatably encircles the boom sleeve 17. A collar or flange 17a anchored to sleeve 17 rotatably supports the sleeve 34 well above the plate 16. The other end of structural 33 carries a side-mounted sleeve 35 which slidably fits upon another vertical post 36 parallel to and spaced inwardly of the boom rack of the main post 18. The post 36 is anchored at its upper end to a cross brace 12a forming part of the boom rack and at its lower edge to the lower structural 12b of the boom rack.

Disposed above the sleeve 34 and likewise rotatably encircling the boom sleeve 17 is a further sleeve 37. The lower end of sleeve 37 rotatably seats upon the upper end of sleeve 34; the upper end is restrained from upward movement on sleeve 17 by a flange or collar 38 anchored to the sleeve 17. The sleeve 37 has an enlarged opening 37a in its wall. Referring to FIG. 9, the vertical edges of the opening are indicated at 37b and 37c, and it will be noted that these approach 180° in angular separation.

Anchored to the sleeve 17 and extending outwardly through the opening 37a is a lug 39. The lug 39 is given a height just slightly less than the height of the opening 37a so that it fits within the opening without substantial interference. It will be noted that in the extended position of the boom (the position in FIGS. 1, 2 and 6) the lug 39 is substantially centered between the edges 37b, 37c of the opening.

Extending radially outwardly from sleeve 37 is a crank arm 40. Pivotally connected to the outer end of crank arm 40 is an operating link 41. The link 41 is pivoted within a clevis or yoke 42 which is mounted on the exposed end of the hydraulic cylinder 31. Also pivoted within yoke 42 on a common axis with the end of link 41 is the line assembly 43. The link assembly 43 is pivoted at its other end to the structural 33. The link 43 preferably comprises a pair of spaced parallel members, each of which is located on an opposite side of the plane containing the link 41 so that link 41 may move between the members making up link assembly 43. The link assembly 43 is provided with an angled or curvilinear configuration, the purpose of which will subsequently be described.

Spaced above the sleeve 37 and similarly rotatably supported on sleeve 17 is still another sleeve 44. Collars or flanges 45 and 46 are located respectively above and below sleeve 44 and are anchored to the sleeve 17 in order to affix the longitudinal location of sleeve 44 on sleeve 17. Boom support members S (which conveniently are cables) are anchored at their upper ends to sleeve 44 and at their opposite ends to an intermediate location on the boom.

While not shown, it will be understood that the cylinder 31 is supplied from a hydraulic circuit involving the hydraulic lines 47, 48 by which hydraulic fluid can be supplied to or permitted to exit from either end of the cylinder as desired. Such hydraulic systems and the valving therefore are well known, and no further description is needed other than to state that the valves for controlling the operation of the cylinder 31 can be located within the cab of the vehicle carrying the boom.

Coming now to a description of the mode of operation, each boom is, as has earlier been noted, under field spraying circumstances extended as shown in the FIG. 1 and 2 positions.

It will be apparent that in the event that either spray boom should strike an obstruction as the vehicle is advancing, the boom is free to swing about the vertical axis of the upright post 18. However, it will also be apparent that, in the event of displacement of the boom from its extended position, it will be elevated; if the boom is deflected rearwardly, then cable 27 will cause the boom to lift (along with the sleeve 17 and all the structure mounted on the sleeve 17 including cylinder 31 and its supporting mechanisms). If the deflection is forward (as might occur during a backing up operation) then cable 28 acts to lift the boom and slide the sleeve 17 upwardly on the post.

It will also be apparent that once the obstruction is cleared, the weight of the boom will tend to return the boom to the extended position, there being nothing to restrain the swinging back, and a moment being exerted by the particular cable which is in tension as a result of the deflection.

At such time as it is desired to move the boom to a side stored position, such as for road travel or for any reason that may require the booms to be moved to a retracted position, the hydraulic system is activated to supply hydraulic fluid to line 48 thereby to extend the cylinder. As the piston exttends, the rod rotates crank 44 through the interconnection of the links 43 and 41. During initial rotation of the sleeve 37, the boom will remain stationary, since rotary displacement of sleeve 18 relative to sleeve 17 is required to move the edge 37b of opening 37a toward lug 39. However, once the edge of 37b engages the lug 39, further displacement will also rotate the sleeve 17, which carries with it the boom 10. As the sleeve 37 continues its rotation, it swings the boom approximately 90° to a side stored position.

For the same reasons explained earlier in connection with boom elevation during deflection, rotation of the boom is accompanied by elevation of the boom with a concomitant elevating of the entire lift mechanism including the cylinder, its support 33, and the structure mounted on sleeve 17. The system is so designed that, by the time the boom reaches the tires 13 of the vehicle, it will be elevated sufficiently to clear the top of the tires.

The use of the curvilinear link 43 and the double link system afforded by 43 and 41 permits the crank throw to be well in excess of the 90° required, or close to 180°.

It will also be apparent that when the boom is in the extended position and with the cylinder 31 fully retracted, the boom is free to move in response to deflection by obstructions without affecting the boom rotation mechanism. The clearance of lug 39 by the ends of the sleeve opening 37a permits almost 90° deflection of the boom in either direction without interference.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for mounting a spray boom on a vehicle, said apparatus comprising
    a frame connected with the vehicle and having a pivot connection for said boom providing for movement of the boom about a substantially vertical pivot axis, said connection also permitting limited upward and downward movement of the boom along said axis and including a vertical post on the frame and a first sleeve on the boom, the sleeve rotatably and slidably fitted over the post,
    stabilizing means interconnecting said boom and frame and operable to yieldably stabilize said boom in an outwardly extending position relative to the vehicle, and
    power means for pivoting said boom from said position to a position substantially parallel to and adjacent said vehicle, said power means including a driving member and means establishing a lost motion connection between said driving member and said boom, said last named means including a second sleeve rotatably encircling said first sleeve and having an opening therein receiving a lug on said first sleeve, said driving member connected with said second sleeve.

2. Apparatus as in claim 1, a hydraulic cylinder supported for up and down movement with said second sleeve, one end of said cylinder pivoted for movement about a vertical axis parallel to said first sleeve, said hydraulic cylinder including a piston rod connected with said driving member for rotating said second sleeve.

3. Apparatus from mounting a spray boom on a vehicle, said apparatus comprising
    a frame connected with the vehicle and having a pivot connection for said boom providing for pivotal movement of the boom about a substantially vertical pivot axis, said connection also permitting limited upward and downward movement along said axis and including a vertical post on the frame and a first sleeve on the boom, the sleeve rotatably and slidably fitted over the post and capable of up and down movement thereon,
    stabalizing means interconnecting said boom and frame and operable to yieldably stabilize said boom in an outwardly extending position relative to the vehicle, said stabilizing means including a pair of suspension members, each having one end connected with the boom outboard of its pivot, and the other end to said frame above the boom and offset from said pivot axis, said other ends being located on opposite sides of said pivot axis,
    power means for pivoting said boom from said position to a position substantially parallel to and adjacent said vehicle, said power means including a driving member and means establishing a lost motion connection between said driving member and said boom, said last named means including a second sleeve rotatably encircling said first sleeve and having an opening therein receiving a lug on said first sleeve, said drive member connected with said second sleeve.

4. Apparatus for mounting a substantially horizontal spray boom on a vehicle, said apparatus comprising
    a frame connected with the vehicle,
    means interconnecting one end of said boom with said frame for pivotal movement of the boom about a vertical axis adjacent to frame and for vertical movement of the boom along said axis while the boom remains substantially horizontal, said means including a post member and sleeve member assembly in which one of the said members is stationary relative to the vehicle and the other member is movable relative to the vehicle,
    stabilizing means including a pair of flexible suspension members operable to yieldably stabilize said boom in an outwardly extending horizontal position relative to the vehicle, each of said suspension members having one end connected with the boom outboard of said vertical axis, and each of said suspension members being supported on said frame above the boom and offset from said vertical axis, one of said suspension members being so supported at a location on the opposite side of said vertical axis from the support location of the other of said support members, each said support locations being fixed relative to the vehicle and frame, and means for applying a pivot moment on said boom to move said boom about said vertical axis toward and alongside said vehicle thereby to simultaneously elevate the boom relative to the frame and vehicle with said one end of said boom moving upwardly along said vertical axis and the boom remaining substantially horizontal during such movement.

5. Apparatus for mounting a substantially horizontal spray boom on a vehicle, said apparatus comprising
    a frame connected with the vehicle,
    means interconnecting one end of said boom with said frame for pivotal movement of the boom about a vertical axis adjacent to frame and for vertical movement of the boom along said axis while the boom remains substantially horizontal, said means including a post member and sleeve member assembly in which one of the said members is stationary relative to the vehicle and the other member is movable relative to the vehicle,
    stabilizing means including a pair of flexible suspension members operable to yieldably stabilize said boom in an outwardly extending horizontal position relative to the vehicle, each of said suspension members having one end connected with the boom outboard of said vertical axis, and each of said suspension members being supported on said frame above the boom and offset from said vertical axis, one of said suspension members being so supported at a location on the opposite side of said vertical axis from the support location of the other of said support members, each said support locations being fixed relative to the vehicle and frame.

* * * * *